United States Patent [19]

White et al.

[11] 3,809,931

[45] May 7, 1974

[54] TEMPERATURE-STABILIZED TRANSDUCER DEVICE

[75] Inventors: Richard M. White, Berkeley, Calif.; Ramesh Chandra Goyal, Edmonds, Wash.

[73] Assignee: The United States of America as represented by the Secretary of the Navy, Washington, D.C.

[22] Filed: Mar. 19, 1973

[21] Appl. No.: 342,348

[52] U.S. Cl............... 310/8.1, 219/210, 310/8.9, 333/30 R
[51] Int. Cl............................................. H01v 7/00
[58] Field of Search........... 310/8, 8.1, 9.7, 9.8, 8.9; 330/30 R; 219/210, 504

[56] References Cited
UNITED STATES PATENTS

| | | | |
|---|---|---|---|
| 3,701,147 | 10/1972 | Whitehouse | 333/30 R X |
| 3,723,916 | 3/1973 | Speiser et al. | 333/30 R |
| 3,681,579 | 8/1972 | Schweitzer | 333/30 X |
| 3,431,392 | 3/1969 | Garland | 310/8.9 X |
| 3,201,621 | 8/1965 | Milner | 310/8.9 |
| 3,715,563 | 2/1973 | Bloch | 219/210 |
| 3,129,346 | 4/1964 | White | 310/8.9 X |

Primary Examiner—J. D. Miller
Assistant Examiner—Mark O. Budd
Attorney, Agent, or Firm—Richard S. Sciascia; Ervin F. Johnston; John Stan

[57] ABSTRACT

A transducer device comprising a substrate capable of propagating an elastic wave on its surface. A resistive film is disposed generally centrally upon the substrate, the film having a grounded lead on one side of the film and an ungrounded lead on the other side of the film. At least one active-channel transducer is disposed on the substrate, for processing a surface-elastic wave, each transducer comprising an input active-channel transducer, disposed on one side, the input side of the resistive film, and an output active-channel transducer, disposed on the other side, the output side, of the resistive film. A reference-channel transducer, also disposed on the substrate, comprises an input reference-channel transducer, disposed on the input side of the film, and connectable to a reference signal source, which causes an elastic surface wave to propagate across the substrate including the area occupied by the resistive film; and an output reference-channel transducer, having an output lead, and disposed on the output side of the film. The combination comprises a surface-wave transducer device which may be temperature-stabilized.

8 Claims, 2 Drawing Figures

TEMPERATURE-COMPENSATED TRANSDUCER DEVICE.

TYPICAL TEST RESULTS WITH AND WITHOUT STABILIZING CIRCUIT CONNECTED.

TEMPERATURE-STABILIZED TRANSDUCER DEVICE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates to a transducer device and apparatus which permits the stabilization of surface elastic wave devices against changes in ambient temperature. The principles described here may be applied to a large number of very different surface-wave devices, such as delay lines and pulse-compression filters.

The velocity of propagation of elastic waves depends upon the temperature of the substance through which the waves travel. This dependence on temperature arises because the elastic constants are temperature-dependent, and because of the thermal expansion of the substance. There are materials with low temperature coefficients of velocity, the so-called isopaustic solids, but these are usually elastically isotropic and hence are nonpiezo-electric. Often piezoelectric solids are preferred for use in surface wave devices such as a tapped delay line, and so the use of elastically anisotropic solids is common.

The transducer device provides a simple means for temperature stabilizing a wide variety of surface wave devices without regard to the materials used in the device or sacrifice of design flexibility. Response of the heater stabilization circuitry is very fast compared with the response obtained if one puts an entire device in an oven. The mode of fabrication of the heater described is compatible with fabrication techniques used for the rest of the surface-wave device. The control circuitry can be quite simple since low powers are involved, and can be incorporated easily in the same package that contains the surface-wave device. The heater is also available for use as a simple trim on the device delay or phase shift.

2. Description of the Prior Art

Devices such as delay lines, which employ propagating elastic waves, have long been made from crystals cut in directions providing low, or even zero, temperature coefficients, to reduce the sensitivity of the delay time to changes of ambient temperature. Unfortunately, the search for low-temperature directions for surface-elastic-wave propagation has yielded few useful directions.

When sufficiently low-temperature coefficient cuts have not been available, it has been the practice to operate bulk elastic-wave devices in temperature-controlled ovens.

Referring now to patents in the prior art, one prior art patent does not contain any resistive heating element, but rather is concerned with using the wave transmission means and dissipation of energy therefrom to heat the medium.

Another prior art patent discloses a device which uses an oven which surrounds the delay line, rather than a resistive film on the line as in this invention; the difference is important, as use of the film in intimate contact with the delay line permits obtaining very fast response to changes of temperature, small size, low heater power, and other advantages.

Yet another prior art patent describes a surface wave transmission structure having a conducting overlay. The invention described herein differs substantially in that the films of this invention are resistive rather than highly conductive (which the prior art patent requires in some embodiments to get substantial alteration of wave velocity): and are thin rather than thick in terms of elastic wavelengths. No attempt is made to affect wave velocity through the presence of the films, whereas such alteration of velocity is the effect desired by this third prior art patent.

SUMMARY OF THE INVENTION

One problem which this invention solves is to keep the surface of the surface-wave device at a constant temperature so as to ensure a constant velocity of propagation. To obtain simple and effective control of the temperature, a feedback control circuit is used in which the phase of a reference sound beam travelling over a path across the surface of the substrate is compared with a desired phase; the phase difference is amplified and used to provide heater current for a thin resistive film deposited on the surface of the substrate of the device. In one embodiment the reference signal is obtained from a stable frequency source external to the device. In a second embodiment the reference signal is more simply derived from an auxiliary circuit integral with the reference channel, consisting of two surface wave transducers between which a conventional electronic amplifier may be connected externally. In this second case the feedback circuit consisting of the two transducers and the amplifier will oscillate at a frequency determined primarily by the frequency response of the transducers and amplifier. The surface wave beam thus produced will then propagate in the reference channel as in the first embodiment.

In the temperature-stabilized surface-wave devices, only a small volume at the surface on which the waves travel are heated. Because of the small volume of the crystal which determines the surface-wave velocity, the heater power required is low and the response time is short.

Discussing the invention is somewhat greater detail, near the top of the temperature stabilized transducer device, on the substrate, are two sets of transducers and two transmission paths, which represent the active channels for the signals which the surface-wave device is designed to process. For example, these might be two channels for delay or pulse compression, operating with broadband signals having center frequencies of hundreds of megahertz. Below these two channels is a reference channel used in the temperature-control feedback circuit. The acoustic waves propagating in the reference channel may be generated at a left-hand transducer by connecting it to a single-frequency oscillator; alternatively, the reference signal may be generated by providing sufficient electronic feedback between two surface-wave transducers located at the left end of the channel. In one embodiment, the reference-channel frequencies were less than 80 MHz.

The reference signal propagates to the output reference-channel transducer, and the phase of the output signal is compared with that of the input signal at the left-hand transducer terminals. The phase difference between these two signals depends upon the temperature of the portion of the crystal over which the reference signal propagates. If a voltage proportional to this phase difference is amplified and supplied to a thin-film heater over most of the surface of the crystal, the surface temperature, and hence the phase velocity in the reference and the signal-processing, or active channels, can be held constant, even though the ambient temperature changes.

OBJECTS OF THE INVENTION

An object of the invention is the provision of a surface-wave device wherein the frequency of the propagating surface waves is temperature-insensitive.

Another object of the invention is to provide a temperature-insensitive surface-wave device which has a very fast response to temperature changes.

Yet another object of the invention is to provide a temperature-insensitive surface-wave device which uses low heater power and is of small size.

Other objects, advantages and novel features of the invention will become apparent from the following detailed description of the invention, when considered in conjunction with the accompanying drawings, wherein:

DESCRIPTION OF THE PREFERRED EMBODIMENTS

Figure 1:
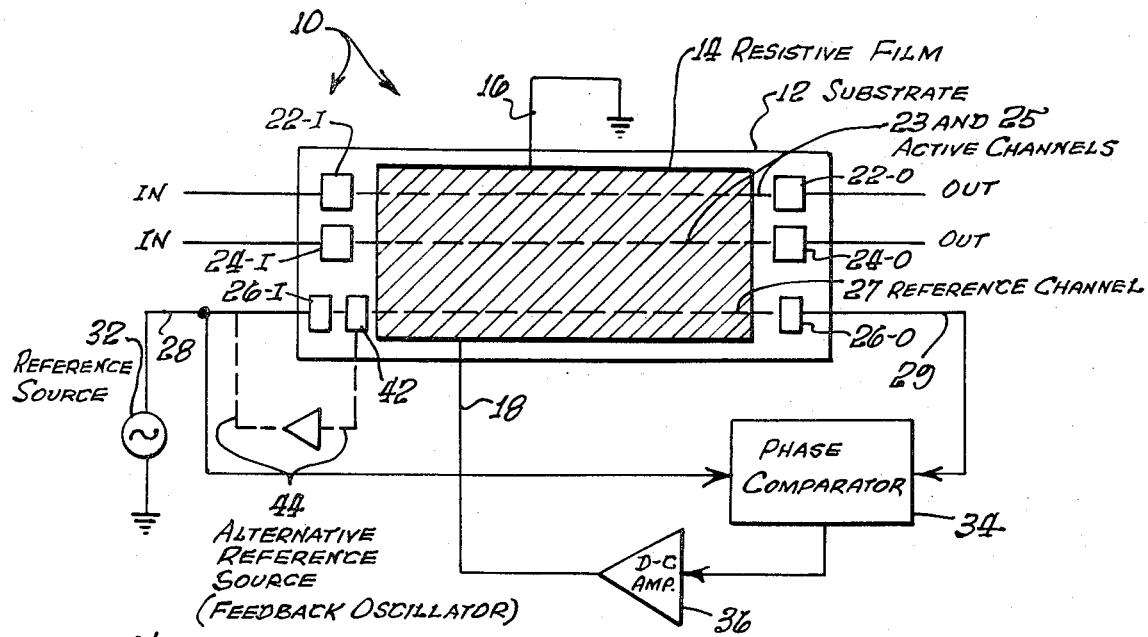
FIG. 1 is a diagrammatic view of the temperature-compensated transducer device of this invention.

Referring now to FIG. 1, this figure shows a transducer device 10 comprising a substrate 12 capable of propagating an elastic wave on its surface. A resistive film 14 is disposed generally centrally upon the substrate 12, the film having a grounded lead 16 on one side of the film and an ungrounded lead 18 on the other side of the film.

At least one active channel transducer, for processing a surface-elastic wave, is disposed on the substrate 12. Two active channel transducers, 22 and 24, are shown in FIG. 1. Each active channel transducer, 22 or 24, comprises an input active-channel transducer 22-I or 24-I, disposed on one side, the input side, of the resistive film 14, and an output active-channel transducer, 22-0 or 24-0, disposed on the other side, the output side, of the resistive film.

A reference-channel transducer 26 is also disposed on the substrate 12. It comprises an input reference-channel transducer 26-I, disposed on the input side of the film 14, and connectable, by lead 28, to a reference signal source 32, which causes an elastic surface wave to propagate across the substrate 12, including the area occupied by the resistive film. The reference channel transducer 26 further comprises an output reference-channel transducer 26-0 having an output lead 29, and disposed on the output side of the film 14. The combination 10 comprises a transducer device which may be temperature-stabilized.

The transducer device 10 may further comprise the reference signal source 32.

In the transducer device 10, the reference signal source may be disposed upon the substrate 12. The general configuration of an oscillator forming such a reference signal source, disposed on a substrate, is described in U.S. Pat. No. 3,701,147, to Harper John Whitehouse, entitled SURFACE WAVE DEVICES FOR SIGNAL PROCESSING, which issued on Oct. 24, 1972. Reference is directed specifically to FIG. 3 of this patent and to column 8, lines 17–43. As is well known in the art, the frequency of oscillation is a function of the spacing of the interdigitations.

As disclosed in the patent, and shown in FIG. 1, the reference signal source may comprise an input transducer 26-I an output transducer 42, the input and output transducers comprising a pair of interdigital transducers; and an amplifier 44 whose input is connected to the output of the output transducer and whose output is corrected to the input of the input transducer, the reference signal source thereby comprising a feedback oscillator.

The minimum insertion loss between the two 10-pair interdigital transducers 26-I and 42, was about 26 dB at approximately 78 MHz. When a tuned power amplifier was connected from the output transducer 42 to the input transducer 26-I, oscillations resulted when the gain was sufficient to overcome the 26 dB loss. When operated for one-half hour in still room air, the oscillator frequency varied only ± 2.7 kHz about its mean value of 78.0 MHz, showing that this oscillator can be fairly stable.

The temperature-stabilized transducer device 10 may further comprise a phase comparator 34, having inputs from the input and output reference-channel transducers, 26-I and 26-0, for sensing the change in the phase length of the signal generated by the reference signal source 32, which traverses the reference channel 27, the path on the substrate 12 aligned with the input and output reference channel transducers. The output of the phase comparator 34 is connected to the ungrounded lead 18 of the resistive film 14. The output voltage of the phase comparator 14 causes current to flow in the resistive film 14, which in turn causes increased or decreased heating of the surface of the substrate 12 in a manner to decrease the change in the phase length of the reference signal traversing the reference channel 27.

To increase the power output of the phase comparator 34, the transducer device 10 will generally further comprise a direct-current amplifier 36 connected between the output of the phase comparator and the ungrounded lead 18 of the resistive film.

In a specific embodiment of the transducer device 10, the substrate 12 was a yz-cut lithium niobate crystal. The transducers had parameters, such as interdigital spacing, designed for operation in the range of 78 MHz, and were made narrow band. The resistive film 14 was sputtered tantalum approximately 500 A. thick, having a terminal resistance of approximately 200 ohms, and rectangular in shape. Evaporated aluminum on a lithium niobate crystal also has been used.

Figure 2:
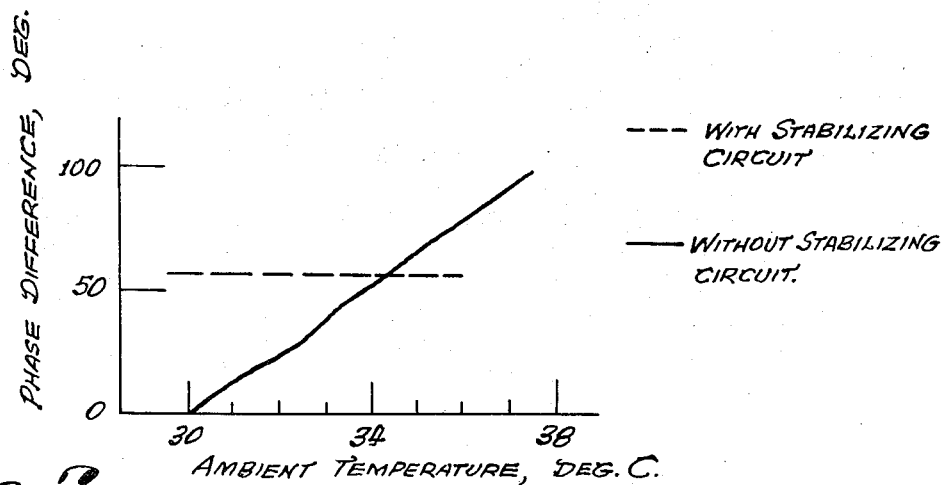
FIG. 2 is a pair of curves comparing typical test results of the transducer device.

A sketch of a typical test result appears in FIG. 2, showing that the use of the feedback circuit greatly reduces the dependence of phase upon temperature. The temperature dependence is due to changes in the velocity of waves on the substrate and to thermal expansion, which causes the distance between the end transducers to vary as the temperature changes. If the second scheme for generating the reference-channel frequency is used, the one involving the use of transducers 26-I and 42, changes in that frequency must also be taken into account.

Typical test results are summarized in FIG. 2. When the feedback stabilization circuit was not connected, there was a change of phase over the length of the reference channel of approximately 80 electrical degrees when the ambient temperature changed from 30° to 38°C. With the stabilization circuit energized, the electrical phase stayed constant within a range ± 0.125° when the temperature changed over about the same range. Put differently, in a test from 25° to 35°C the phase change measured with the stabilization circuit operating corresponded to that one would have obtained had the ambient temperature changed only ± 0.017°C instead of the full 10° it actually changed.

In summary, it has been shown that a thin resistive film connected in a phase-lock feedback loop can stabilize a surface-wave device against changes of ambient temperature.

The feedback circuitry might employ means other than thermal to control phase velocity; examples are the control of piezoelectric stiffening by using a piezoelectric transducer to move an electrical conductor near the surface of the surface-wave device, field-effect control of the conductance of a semiconducting film on a piezoelectric surface-wave device, and control of the degree of poling of a ferroelectric crystal with a field plate on its surface. One advantage of the thermal control is its applicability to crystals which are nonpiezoelectric, weakly piezoelectric or nonferroelectric. Finally, a relatively stable reference frequency is clearly necessary. For moderate stabilisation, the three-transducer arrangement involving transducers 26–I, 42 and 26–0, of FIG. 1 may suffice. For greater stability, an external-reference generator could be made with a conventional low-temperature-coefficient bulk-wave oscillator crystal; alternatively, one might use a feedback-oscillator section like that sketched in FIG. 1, which had on it only in the reference-oscillator section a temperature-compensating overlay film whose thickness was appropriate for the reference frequency employed.

Obviously many modifications and variations of the present invention are possible in the light of the above teachings. It is therefore to be understood that within the scope of the appended claims the invention may be practiced otherwise that as specifically described.

What is claimed is:

1. A transducer device comprising:
    a substrate capable of propagating an elastic wave on its surface;
    a resistive film, disposed upon the substrate, of substantially rectangular shape, with the longer sides of the rectangle parallel to the direction of propagation of the wave, one of short sides of the rectangle determining an input side of the film, the other short-side determining an output side, the film having a grounded lead connected to one of the longer sides of the film and an ungrounded lead connected to the other longer side of the film;
    at least one active-channel transducer disposed on the substrate, for processing a surface-elastic wave, each transducer comprising:
        an input active-channel transducer, disposed on the input side of the resistive film; and
        an output active-channel transducer, disposed on the output side of the resistive film; and
    a reference-channel transducer, disposed on the substrate, comprising:
        an input reference-channel transducer, disposed on the input side of the film, and connectable to a reference signal source, which causes an elastic surface wave to propagate across the substrate, including the area occupied by the resistive film; and
        an output reference-channel transducer, having an output lead, and disposed on the output side of the film;
    a phase comparator, having inputs from the input and output reference-channel transducers, for sensing the change in the phase length of the signal generated by the reference signal source, which traverses the reference channel, the path on the substrate aligned with the input and output reference channel transducers;
    the output of the phase comparator being connected to the ungrounded lead of the resistive film;
    the output voltage of the phase comparator causing current to flow in the resistive film, which in turn causes increased or decreased heating of the surface of the substrate in a manner to decrease the change in the phase length of the reference signal traversing the reference channel; and therefore of the elastic waves processed by the activechannel transducers;
    the combination comprising a temperature-stabilized transducer device.

2. The transducer device according to claim 1 further comprising:
    the reference signal source.

3. The transducer device according to claim 3, wherein
    the reference signal source is disposed upon the substrate.

4. The transducer device according to claim 4, wherein
    the reference signal source comprises:
        an input transducer; and
        an output transducer;
        an amplifier whose input is connected to the output of the output transducer and whose output is connected to the input of the input transducer;
    the reference signal source thereby comprising a feedback oscillator.

5. The transducer device according to claim 5, wherein
    the input and output transducers comprise a pair of interdigitated transducers.

6. The transducer device according to claim 1, further comprising:
    a direct-current amplifier connected between the output of the phase comparator and the ungrounded lead of the resistive film.

7. The transducer device according to claim 6, further comprising:
    a direct-current amplifier connected between the output of the phase comparator and the ungrounded lead.

8. The transducer device according to claim 7, wherein
    the substrate is a yz-cut lithium niobate crystal;
    the transducers have parameters designed for operation in the range of 78 MHz; and
    the resistive film is sputtered tantalum approximately 500 A. thick, having a terminal resistance of approximately 200 ohms, and rectangular in shape.

* * * * *